United States Patent
Gupta et al.

(10) Patent No.: US 6,345,051 B1
(45) Date of Patent: Feb. 5, 2002

(54) METHOD AND APPARATUS FOR MULTIPLEXING OF MULTIPLE USERS ON THE SAME VIRTUAL CIRCUIT

(75) Inventors: Dev Vrat Gupta, Flemington; John Lo, Morris Plains; Carlos Cao, Flemington; Lee Baker, Columbia, all of NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/025,177

(22) Filed: Feb. 18, 1998

Related U.S. Application Data
(60) Provisional application No. 60/038,058, filed on Feb. 18, 1997.

(51) Int. Cl.[7] .................................................. H04J 3/24

(52) U.S. Cl. ...................... 370/395; 370/260; 370/270; 370/349; 370/390; 370/432

(58) Field of Search ................................ 370/237, 516, 370/397, 395, 259, 396, 257, 229, 419, 232, 432, 352, 351, 389, 349, 357, 323, 355, 356, 260, 270, 390; 375/285; 709/247

(56) References Cited

U.S. PATENT DOCUMENTS

| | | | |
|---|---|---|---|
| 5,420,858 A | * 5/1995 | Marshall et al. | 370/60.1 |
| 5,453,980 A | 9/1995 | Van Engelshoven | 370/60.1 |
| 5,457,681 A | 10/1995 | Gaddis et al. | 370/56 |
| 5,544,161 A | 8/1996 | Bigham et al. | 370/58.1 |
| 5,648,969 A | * 7/1997 | Pasternak et al. | 370/349 |
| 5,666,487 A | * 9/1997 | Goodman et al. | 370/395 |
| 5,818,842 A | * 10/1998 | Burnel et al. | 370/397 |
| 6,115,373 A | * 9/2000 | Lea | 370/355 |

FOREIGN PATENT DOCUMENTS

| WO | WO 96/04729 | * 2/1996 |
|---|---|---|

OTHER PUBLICATIONS

Esaki H et al. High Speed Datagram Delivery over Internet Using ATM Technology, IEICE Transations on Communications, vol. E78–B, No.8, pp. 1208–1217, Aug. 1995.*

Heinanen, J., "Multiprotocol Encapsulation over ATM Adaptation Layer 5," RFC 1483 pp. 1–16 Jul. (1993).

Laubach, M., "Classical IP and ARP over ATM," RFC 1577 pp. 1–17 Jan. (1994).

Hiroshi Esaki, et al., "High Speed Datagram Delivery over Internet Using ATM Technology," *IEICE Transactions on Communications*, E78–B(8), pp. 1208–1217 (Aug., 1995).

KIng, T.J., et al., "Internetworking over asynchronous transfer mode networks," *BT Technology Journal*, 13(3), pp. 92–101 (Jul., 1995).

* cited by examiner

Primary Examiner—Douglas Olms
Assistant Examiner—Shick Hom
(74) Attorney, Agent, or Firm—Hamilton Brook Smith & Reynolds, P.C.

(57) ABSTRACT

The invention provides a method and apparatus for communicating to a destination node over a broadband network from plural users connected to an access node. A virtual circuit is provisioned through the broadband network for connecting the access node to the destination node. Data units are received from plural users at the access node, with each data unit having plural cells. The data units are multiplexed onto the virtual circuit at the access node such that the cells of any one data unit are noninterleaving with the cells of any other data unit on the virtual circuit. In a preferred embodiment, the destination node is a service provider node in an ATM network and the data units are Ethernet protocol data units that comprise plural ATM cells. According to another aspect, an access node for communicating to a service provider node over an ATM network includes at least one line unit for transmitting Ethernet protocol data units to and from plural users, each Ethernet protocol data unit comprising plural ATM cells, the line unit coupling the ATM cells to and from a communication bus. A trunk unit coupled to the communication bus transmits and receives ATM cells to and from the ATM network.

14 Claims, 7 Drawing Sheets

METHOD AND APPARATUS FOR MULTIPLEXING OF MULTIPLE USERS ON THE SAME VIRTUAL CIRCUIT

RELATED APPLICATION

This application claims the benefit of U.S. Provisional Application No. 60/038,058, filed on Feb. 18, 1997, the entire teachings of which are incorporated herein by reference.

BACKGROUND OF THE INVENTION

In recent years there has been a tremendous growth in data communications, especially among residential users accessing the global Internet and the World Wide Web. Many of these residential users gain such access through gateway services provided by an internet service provider (ISP).

With the growth in Internet-related data traffic, network service providers (NSPs) have had to seek ways to quickly upgrade network facilities to alleviate congestion and bottlenecks in their networks. The NSPs have begun to deploy asynchronous transfer mode (ATM) technology in the core or backbone of the networks as an efficient and flexible means of carrying the large amounts of data traffic. ATM is also reaching to the edge or access portion of the network where it is being deployed in digital subscriber loop access multiplexers (DSLAM) or access nodes that connect residential users to ISPs through the ATM network.

Packet data communication between ISPs and residential users is supported by the Internet Protocol (IP). In the standard approach for carrying IP traffic over ATM, each connection between a user and an ISP requires a separate virtual circuit (VC). Since switched virtual circuit support in the ATM backbone network is not likely to happen in the short term, these virtual circuits are permanent virtual circuits (PVCs) which need to be present whether the end user is actively connected or simply idle. The number of PVCs required for a large scale network with many users and many possible destinations can be prohibitive to meet and manage. With a standard network trunk (e.g., SONET OC-3 rate) able to support only about 1000 virtual circuits, such a limitation means that a network trunk terminated at the ISP can only support about 1000 potential users.

SUMMARY OF THE INVENTION

The above problems are overcome and other advantages achieved with the present invention. According to the invention, data packets from multiple users destined for a particular ISP are multiplexed onto the same virtual circuit. The multiplexing method and apparatus of the present invention provides for more efficient use of virtual circuits in an ATM network. In addition, a network trunk terminated at the ISP can reach more access nodes. As each access node is connected to hundreds of users, a single trunk at the ISP can reach many more than 1000 potential users. Depending on the expected internet access demand from the end users, a much more economical configuration of permanent virtual circuits between ISPs and access nodes can be realized using the principles of the present invention.

Accordingly, the invention provides a method and apparatus for communicating to a destination node over a broadband network from plural users connected to an access node. A virtual circuit is provisioned through the broadband network for connecting the access node to the destination node. Data units are received from plural users at the access node, with each data unit having plural cells. The data units are multiplexed onto the virtual circuit at the access node such that the cells of any one data unit are noninterleaving with the cells of any other data unit on the virtual circuit. In a preferred embodiment, the destination node is a service provider node in an ATM network and the data units are Ethernet protocol data units that comprise plural ATM cells.

According to an aspect of the invention, access to multiple service provider nodes is provided at the same or differing priority levels. Accordingly, a second virtual circuit is provisioned to a second service provider node. Ethernet protocol data units on the first virtual circuit have a first service priority and the second Ethernet protocol data units on the second virtual circuit have a second service priority, the first priority being higher than the second priority, such that the multiplexing step includes preempting ATM cells of the second Ethernet protocol data units with ATM cells of the first Ethernet protocol data units.

According to another aspect of the invention, an access node for communicating to a service provider node over an ATM network from plural users includes at least one line unit for transmitting downstream and receiving upstream Ethernet protocol data units to and from plural users, each Ethernet protocol data unit comprising plural ATM cells, the line unit coupling the ATM cells to and from a communication bus. A trunk unit coupled to the communication bus transmits upstream ATM cells and receives downstream ATM cells to and from the ATM network.

The line unit further includes means for multiplexing the upstream Ethernet protocol data units onto a virtual circuit connecting the access node to the service provider node such that the ATM cells of any one upstream Ethernet protocol data unit are noninterleaving with the ATM cells of any other upstream Ethernet protocol data unit on the virtual circuit. The line unit further includes means for selecting downstream ATM cells from the communication bus that are destined for any of the plural users associated therewith based on a virtual circuit identifier and a PDU address in the data unit. The means for selecting includes means for detecting the start of an Ethernet protocol data unit, means for buffering the ATM cell, means for detecting the PDU address, and means for buffering all ATM cells of the Ethernet protocol data unit for transmission to the user associated with the PDU address.

According to another aspect of the invention, an access node provides multi-destination support to allow users to select among destination service provider nodes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
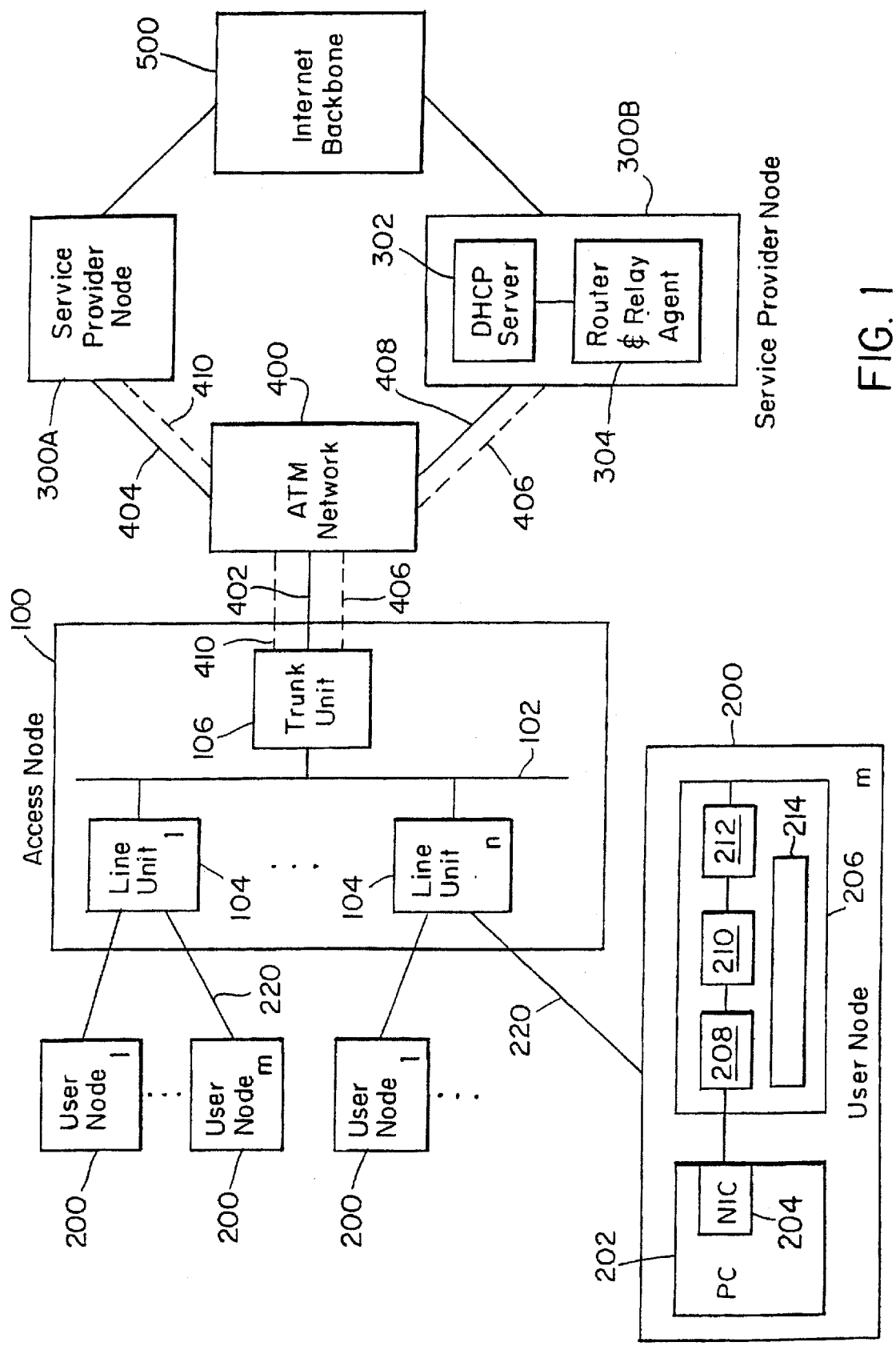
FIG. 1 is a schematic block diagram of a system in accordance with the present invention.

Referring to FIG. 1, a network configuration is there shown illustrating the principles of the present invention. FIG. 1 shows an end-to-end network connection between an access node 100 and service provider (SP) nodes 300A, 300B. User nodes 200 connect to the access node 100 over individual communication paths 220. One or more line units 104 at the access node 100 terminate the communication paths 220, with each line unit serving several user nodes 200. The access node 100 includes a communication bus 102 for transporting data between the line units 104 and a trunk unit 106. The trunk unit 106 provides a high data rate interface (e.g., SONET OC-n rate) to a data network such as public ATM network 400 over communication path 402.

A virtual circuit is provisioned from the access node 100 for connection to each of the SP nodes 300A, 300B. Likewise, a virtual circuit is provisioned from each of the SP nodes 300A, 300B for connection to the access node 100. The virtual circuits between the access node 100 and each of the respective SP nodes 300A, 300B are collectively designated 410, 406. As described further below, data packets from multiple users that are destined for a particular SP node are multiplexed on the same virtual circuit for that SP node. The communication between end users and the SP node is via Ethernet frames over ATM. Ethernet frames over ATM are used so that dynamic IP address assignment to the end user by the SP node can be provided. In addition, other non-IP protocols such as IPX or AppleTalk can be supported using the principles of the invention.

It should be noted that throughout the specification the terms "subscriber", "user" and "end user" are used interchangeably.

The SP nodes 300A, 300B, which encompass internet service providers and corporate local area networks, are connected to the ATM network 400 over respective communication paths 404, 408. The SP nodes 300A, 300B also connect to the public Internet through Internet backbone 500. It should be noted that the Internet backbone itself can be included in the ATM network 400. As shown in FIG. 1, the SP node 300B includes a router 304 that provides ATM to Ethernet bridging and also routes IP traffic from the access node 100 onto the Internet. A dynamic host configuration protocol (DHCP) server 302 connected to the router 304 provides assignment of IP addresses to end users.

There are several advantages of multiplexing ATM traffic from multiple users of access node 100 onto the same virtual circuit. The virtual circuit provisioning and capacity requirements become much more manageable, resolving the scale problem caused by using permanent virtual circuits in the ATM backbone network. Many more users can be supported beyond the present limits (e.g., by a factor of 100 if 100 users on an access node share the same virtual circuit). For an ISP, each ATM port can reach more users (e.g., by a factor of 100 if 100 users on an access node subscribe to the same ISP and thus use the same virtual circuit). Virtual circuit sharing also naturally supports downstream multicast applications without the need for replication of ATM traffic between an SP node 300A, 300B and an access node 100.

The user node 200 includes one or more CPUs or personal computers 202 that each include an Ethernet network interface card (NIC) 204. An Ethernet network interface device (ENID) 206 coupled to the NIC 204 provides an interface for sending and receiving Ethernet frames over ATM between the Ethernet NIC 204 and the access node 100. The ENID 206 includes an Ethernet interface 208, an ATM Adaptation Layer (AAL5) segmentation/reassembly (SAR) block 210, a physical interface module (PIM) 212 and a processor 214. The PIM 212 is connected to communication path 220 and is operable to convert between XDSL transmission signals (e.g., quadrature amplitude modulation, carrierless amplitude/phase modulation or discrete multitone) and an ATM Utopia interface. The SAR block 210 performs the AAL5 SAR function to encapsulate Ethernet frames as bridged protocol data units (PDUs) with LLC/SNAP headers as specified by RFC 1483 ("Multiprotocol Encapsualtion over ATM Adaptation Layer 5", RFC 1483, July 1993). As described further below, the ENID 206 communicates with line unit 104 in the access node 100 to coordinate virtual circuit usage for communication with the SP nodes. The ENID 206 also participates in traffic congestion control to support specified quality of service (QoS) levels.

Figure 2:
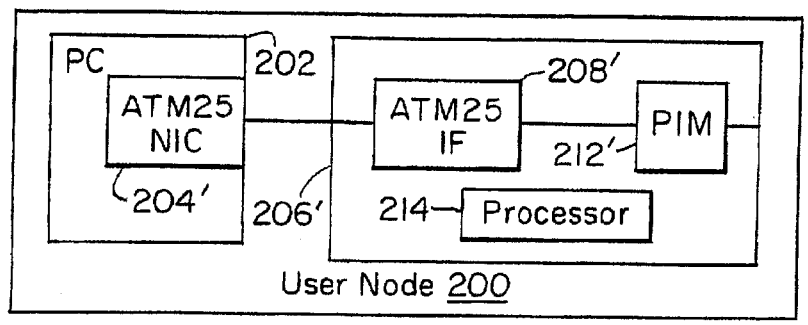
FIG. 2 is a schematic block diagram of an alternate embodiment of apparatus located at a user node of the system of FIG. 1.

In an alternate embodiment of apparatus located at the user node 200 shown in FIG. 2, the Ethernet NIC 204 and ENID 206 are respectively replaced with an ATM-25 NIC 204' and an ATM network interface device (ANID) 206'. The ANID 206' includes an ATM-25 interface 208' and physical interface module 212' for converting ATM signals transmitted over the xDSL loop from the access node 100 to ATM-25 format. A driver associated with the ATM-25 NIC 204' transmits and receives Ethernet frames over ATM using standard RFC 1483-bridged PDUs with LLC/SNAP header. The ANID 206' can also be integrated into the ATM-25 NIC 204', creating an XDSL NIC card, or INID (integrated network interface device) for a more economical device.

The access node 100 is a network access device, sometimes referred to as a digital subscriber loop access multiplexer (DSLAM), that employs ATM at its level-2 network layer to enable flexibility of application and services and utilizes xDSL (digital subscriber line) technology to provide high speed data communication to subscribers via telephone lines 220. The access node 100 can be constructed from the teachings in U.S. Pat. No. 5,555,244 (Gupta et al.), which is incorporated herein by reference in its entirety.

As noted above, the access node 100 includes a trunk unit 106 and several subscriber line units 104. In a preferred embodiment, each line unit 104 includes subscriber ports to support multiple users via copper loops 220. For downstream data traffic, defined as data transmission from one of the SP nodes 300A, 300B to one of the user nodes 200, the trunk unit 106 terminates the OC-n signal received on communication path 402 and places received ATM cells on the backplane bus 102. The line units 104 select ATM cells that are destined to end users connected to its ports and transmit these cells downstream to the appropriate user via xDSL transmission on respective copper loops 220.

For upstream data traffic, the line units 104 place ATM cells from end users on the backplane bus 102. The trunk unit 106 picks up these upstream ATM cells from the bus 102 for transmission to the SP nodes 300A, 300B via the ATM network 400.

The line units 104 perform critical functions in order to support multiplexing of Ethernet PDUs from multiple users connected to the access node 100 in a single virtual circuit. For upstream transmission, the line units 104 ensure that ATM cells for PDUs from various users on the same virtual circuit do not interleave. Without such non-interleaving, upstream ATM cells arriving at the SP node 300A, 300B could not be reassembled as PDUs. For downstream transmission, each line unit 104 selects ATM cells for its users based on both virtual circuit identification and the Ethernet media access control (MAC) address of the received PDUs as described further herein.

For upstream traffic, a media (backplane) access scheme among the line units 104 is utilized to avoid ATM cell interleaving on the backplane bus 102. A line unit 104 must contend with other line units for the opportunity to transmit a PDU. Each line unit 104 self-arbitrates access to the media (backplane). Access is determined using a round-robin and priority scheme. When a particular line unit gains access to the bus 102, the line unit holds the bus and transmits the ATM cells of a complete PDU before releasing its bus access to the next contending line unit. Thus, ATM cells within a PDU are not interleaved with cells from a PDU of another user using the same virtual circuit.

To minimize delay and delay variations due to large PDU sizes, the line unit contention scheme supports multiple priority levels. Thus, line units with ATM cells having higher priority are given access to the bus as soon as transmission of the current ATM cell is complete. These higher priority cells can pre-empt transmission of a lower priority PDU at the ATM cell level. When higher priority cell transmission is completed, the lower priority packet transmission resumes where it left off. Thus, higher priority packets are transmitted before lower priority packets. This functionality is important to support different grades of service.

Within the same priority, PDUs are transmitted on a first-come, first-served, distributed-queuing basis. A higher priority cell interrupting lower priority cells does not cause problems because the cells are associated with different virtual circuits.

Figure 3:
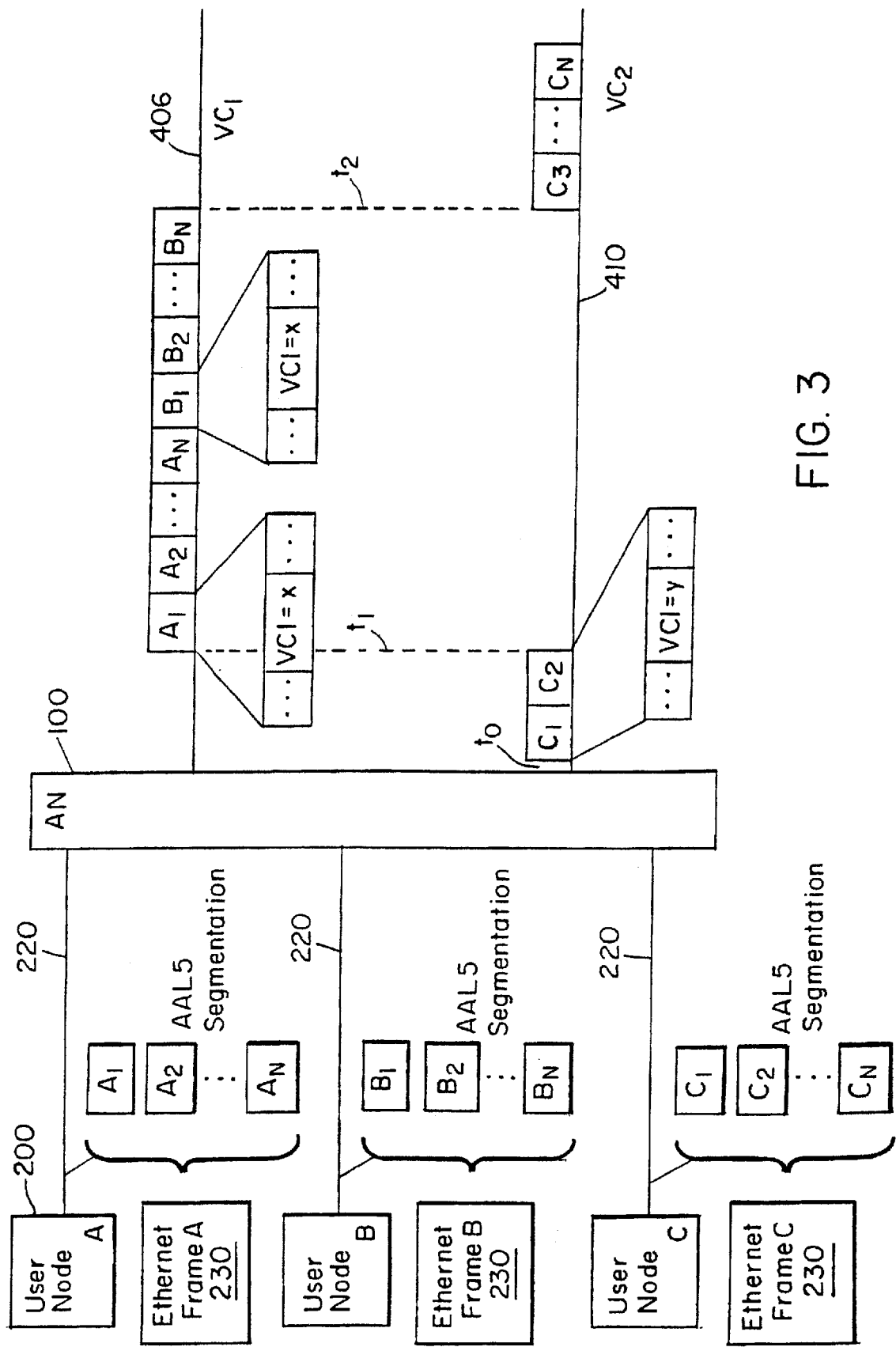
FIG. 3 is a diagram illustrating multiplexing aspects of the present invention.

FIG. 3 illustrates the virtual circuit multiplexing principles of the present invention. A simplified view of access node 100 is shown with connected user nodes 200 further designated A, B and C. The user nodes 200 generate Ethernet frames 230 which are converted into ATM cells $A_1$, ... $A_N$; $B_1$, ... $B_N$; and $C_1$, ... $C_N$ according to the ATM Adaptation Layer 5 (AAL5) segmentation function specified by RFC 1483.

Figure 4:
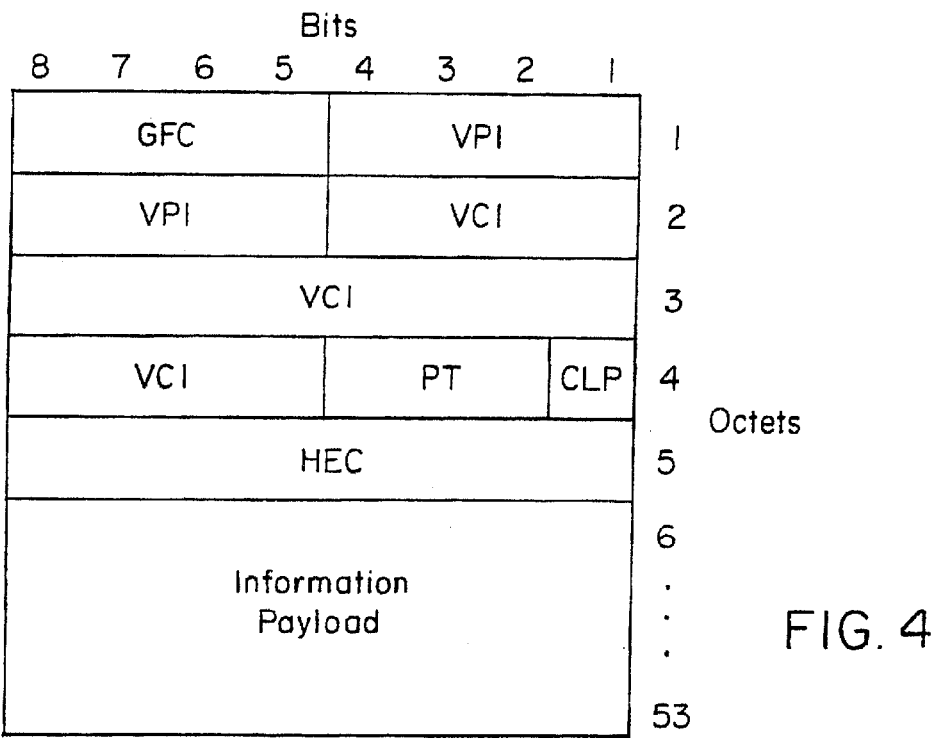
FIG. 4 is a diagram of an ATM user-network interface (UNI) cell format.

The standard ATM user-network interface cell format is shown in FIG. 4. The ATM cell contains 53 octets and has two parts: a 5-octet header and a 48-octet payload. The header includes the following fields: generic flow control (GFC); virtual path identifier (VPI); virtual channel identifier (VCI); payload type (PT); cell loss priority (CLP); and header error check (HEC). The VPI and VCI fields together represent an ATM address that is used for mapping incoming VPI/VCI to outgoing VPI/VCI based on the connection type (permanent virtual circuit or switched virtual circuit).

Referring again to FIG. 3, a first virtual circuit VC is shown which corresponds to the virtual circuit 406 connected to SP node 300B in FIG. 1. Likewise, a second virtual circuit $VC_2$ is shown which corresponds to virtual circuit 410 connected to SP node 300A. Virtual circuits $VC_1$ and $VC_2$ are carried on the same physical path 402. User nodes A and B transmit their respective Ethernet frames 230 to the SP node 300B via the same virtual circuit $VC_1$. User node C transmits its Ethernet frames to SP node 300A via a different virtual circuit $VC_2$. Through a meta-signaling process described further herein below, the user nodes 200 are sent an information packet that includes the identification of the virtual circuit for the desired destination node. The virtual circuit can be identified by the VCI field in each ATM cell. For ATM cells $A_1$, ... $A_N$ and $B_1$, ... $B_N$, the VCI field is set to a value designated x in FIG. 3. Similarly, for ATM cells $C_1$, ... $C_N$ the VCI field is set to a value designated y.

As shown, the ATM cells of a complete Ethernet frame (or PDU) for user node A are transmitted before the cells of the next contending user node (user node B) are transmitted. Thus, the ATM cells associated with Ethernet frame A are not interleaved with the cells of Ethernet frame B.

The priority scheme is also shown in FIG. 3, wherein for this example, traffic associated with virtual circuit $VC_1$ has been given a higher priority than traffic on virtual circuit $VC_2$. Transmission of ATM cells $C_1$, ... $C_N$ of Ethernet frame C begins at time $t_0$. At a time $t_1$ after cells $C_1$ and $C_2$ have been transmitted, traffic at the higher priority associated with user nodes A and B pre-empts transmission on virtual circuit $VC_2$. When transmission of Ethernet frames A and B on virtual circuit $VC_1$ is completed at time $t_2$, transmission of Ethernet frame C resumes on virtual circuit $VC_2$.

The backplane bus 102 includes a horizontal bus, HBUS, to which the line units 104 connect and a vertical bus, VBUS, which is capable of linking several horizontal buses together in order to create modularity for the addition of subscribers. Further details of such bus structure are disclosed in the aforementioned U.S. Pat. No. 5,555,244.

The section describes the flow of data on the backplane bus 102. For the purposes of this description, the downstream direction refers to data flowing toward the subscriber, and upstream refers to data flow toward the network.

The upstream portion of bus 102 comprises a 16 bit bus. There are also four arbitration leads which are the basis for resolving contention among line units 104. In the preferred embodiment, it takes 27 clock cycles to send a cell. While the current cell is being transmitted, the four arbitration leads are used to resolve who will send in the next cell time. It takes 9 clock cycles to resolve which subscriber port can gain access to the bus in the next cell time. It should be noted that a greater or lesser number of cycles may be needed depending on the number of ports supported per line unit.

The table below shows how the four arbitration leads are used in each clock cycle:

cycle. This continues in cycles 5 and 6 after which only a single slot will be contending. The same procedure then continues in cycles 7–9, but at the port level. After cycle 9, only a single subscriber will have won. One important aspect of this algorithm is that all ports can see if multiple ports are contending at the priority. This is necessary for fairness.

Figure 5:
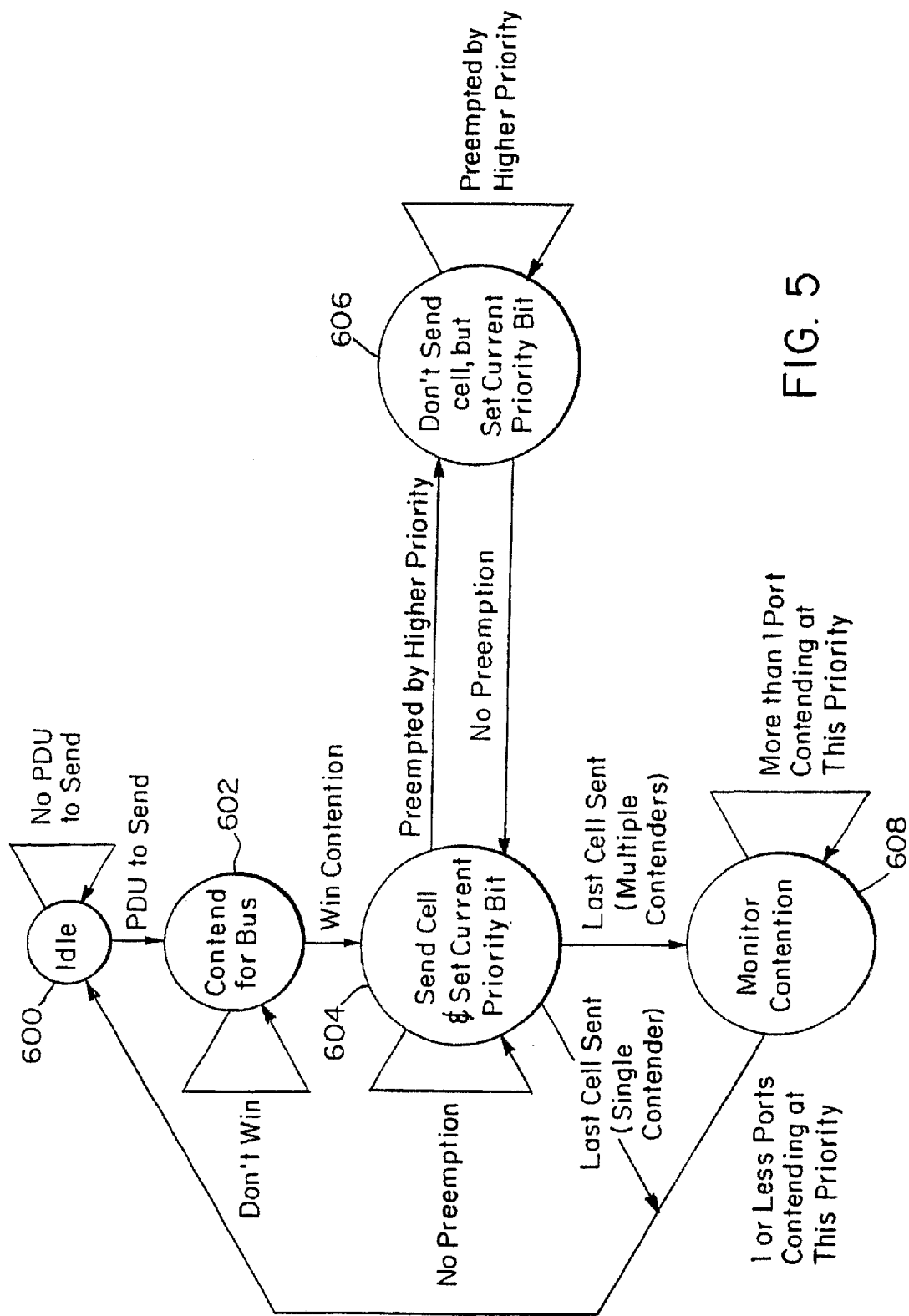
FIG. 5 is a flow diagram illustrating upstream processing of user protocol data units in accordance with the present invention.

Referring now to FIG. 5, a state diagram is shown for each subscriber port on line unit 104 illustrating upstream processing of user PDUS. The diagram relates to a subscriber port at a particular priority level. The states include idle state 600, bus contention state 602, cell transmission state 604, cell transmission waiting state 606, and contention moni-

|  | Start of current cell; queue congestion indication | Ports indicate current access priority | Currently transmitting or preempted PDU priority | Requesting slot ID | | | Requesting port ID | | |
|---|---|---|---|---|---|---|---|---|---|
|  | Cycle 1 | Cycle 2 | Cycle 3 | Cycle 4 | Cycle 5 | Cycle 6 | Cycle 7 | Cycle 8 | Cycle 9 |
| Arbitration Bit 1 | Priority Level 1 congested | Priority Level 1 | Priority Level 1 | Slots 1–8 | Slots 1–4, 9–12 | Slots 1, 5, 9 | Ports 1–8 | Ports 1–4, 9–12 | Ports 1, 5, 9 13 |
| Arbitration Bit 2 | Priority Level 2 congested | Priority Level 2 | Priority Level 2 | Slots 9–12 | Slots 5–8 | Slots 2, 6, 10 | Ports 9–16 | Ports 5–8, 13–16 | Ports 2, 6, 10 14 |
| Arbitration Bit 3 | Priority Level 3 congested | Priority Level 3 | Priority Level 3 | TBD | TBD | Slots 3, 7, 11 | TBD | TBD | Ports 3, 7, 11 15 |
| Arbitration Bit 4 | Priority Level 4 congested | Priority Level 4 | Priority Level 4 | TBD | TBD | Slots 4, 8, 12 | TBD | TBD | Ports 4, 8, 12 16 |

The first cycle is used by the trunk unit to indicate that a particular priority is congested. Only the trunk unit sets these bits which are read by the subscriber ports and cause the subscriber ports to stop contending for the next cell time at that priority level. If the ports have a cell to send at a lower priority, they continue to contend.

The second cycle is used by the subscriber ports to indicate at which priority level they wish to contend. If a port has data to send, it will set the bit of the priority that the data is to be sent. Priority 1 is the highest priority while 4 is the lowest. Ports that are contending below the highest bit set in this cycle are disqualified and back off until the next cell cycle. Ports that are in the process of sending a PDU should not set the priority bit during this cycle.

The third cycle is used by a subscriber port to indicate that it is in the process of transmitting a cell at this priority or is currently preempted. Only one port should ever be setting this bit at any of the four priority levels. It is possible for all priorities to be set if four PDUs, one at each of the levels, is in the process of being sent. Note that it is possible that a single port may be concurrently sending PDUs at multiple priorities.

The next three cycles are used to reduce the number of contending subscribers on a slot basis. Each port that has data to send at the priority that won in the second cycle will set the bits in these cycles based on its slot ID. Lower number slots will back off if a higher number slot is contending. Thus, slots 9–12 may be disqualified in this toring state 608. Each subscriber port maintains this state at all of the priority levels. All transitions from one state to another occur during a cell cycle based on the result of the above-noted contention scheme, except for the idle state 600. Transitions out of the idle state 600 may occur at any time.

The last state 608, which calls for the port to monitor the contention result, is essential to guarantee fairness. This state ensures that all subscriber ports have an opportunity to transmit before any particular port will go a second time. Note that, if only one port is transmitting, this will require one idle cell time between successive PDUs. If multiple ports are transmitting, no idle times will exist. This condition is acceptable if only one port is transmitting.

The line unit 104 is provisioned to filter and pickup downstream ATM cells based on the virtual circuit identification and MAC address of the Ethernet PDU. For MAC address filtering, the line unit detects the start of an AAL5 PDU, buffers the cell until receipt of the Ethernet MAC address field, and if the MAC address matches, buffers and transmits all of the cells in the PDU downstream to the user node 200. If the MAC address is either the broadcast or multicast MAC address, the Ethernet PDU also is picked up and sent to the appropriate user node.

The downstream portion of horizontal bus 102 comprises a 16 bit data bus. A continuous flow of data is maintained with idle ATM cells inserted when no valid data is available from trunk unit 106. A 10 MHZ clock signal is driven onto the backplane bus by the trunk unit 106. A Start of Cell (SOC) signal is sourced by the trunk unit to synchronize the line units 104 with the data flow. An Idle signal is sourced by the trunk unit to inform the line units that the current cell is an idle cell and need not be processed.

Figure 6:
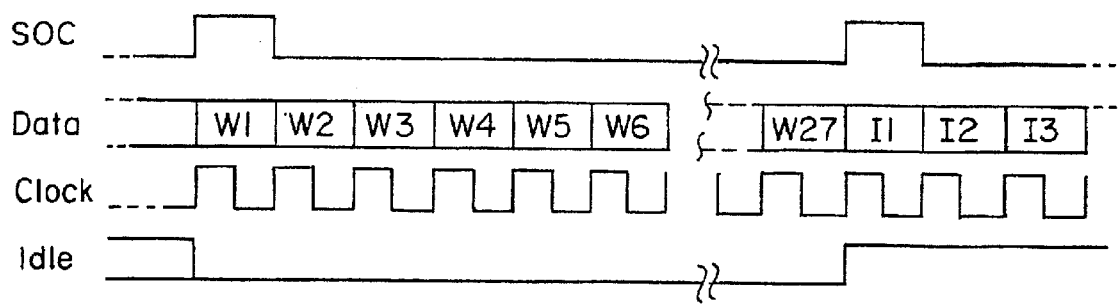
FIG. 6 is a timing diagram illustrating downstream timing on the backplane.

The timing of data flow in the downstream direction is shown in FIG. 6. The data format has the most significant bit on bit 15 (the first bit of the ATM cell transmitted serially), and the least significant bit on bit 0. The values on the Data signal are as follows, where XX is "don't care":

W1: H1, H2, Header bytes of data cell
W2: H3, H4
W2: HEC, XX
W3: P1, P2
W4: P3, P4
.
etc. through W26
.
W27: P47, P48
I1: 00, 00 Header bytes of idle cell
I2: 00, 01
I3: HEC, XX
I4: 6A, 6A (6A is the payload of idle cells)

Figure 7:
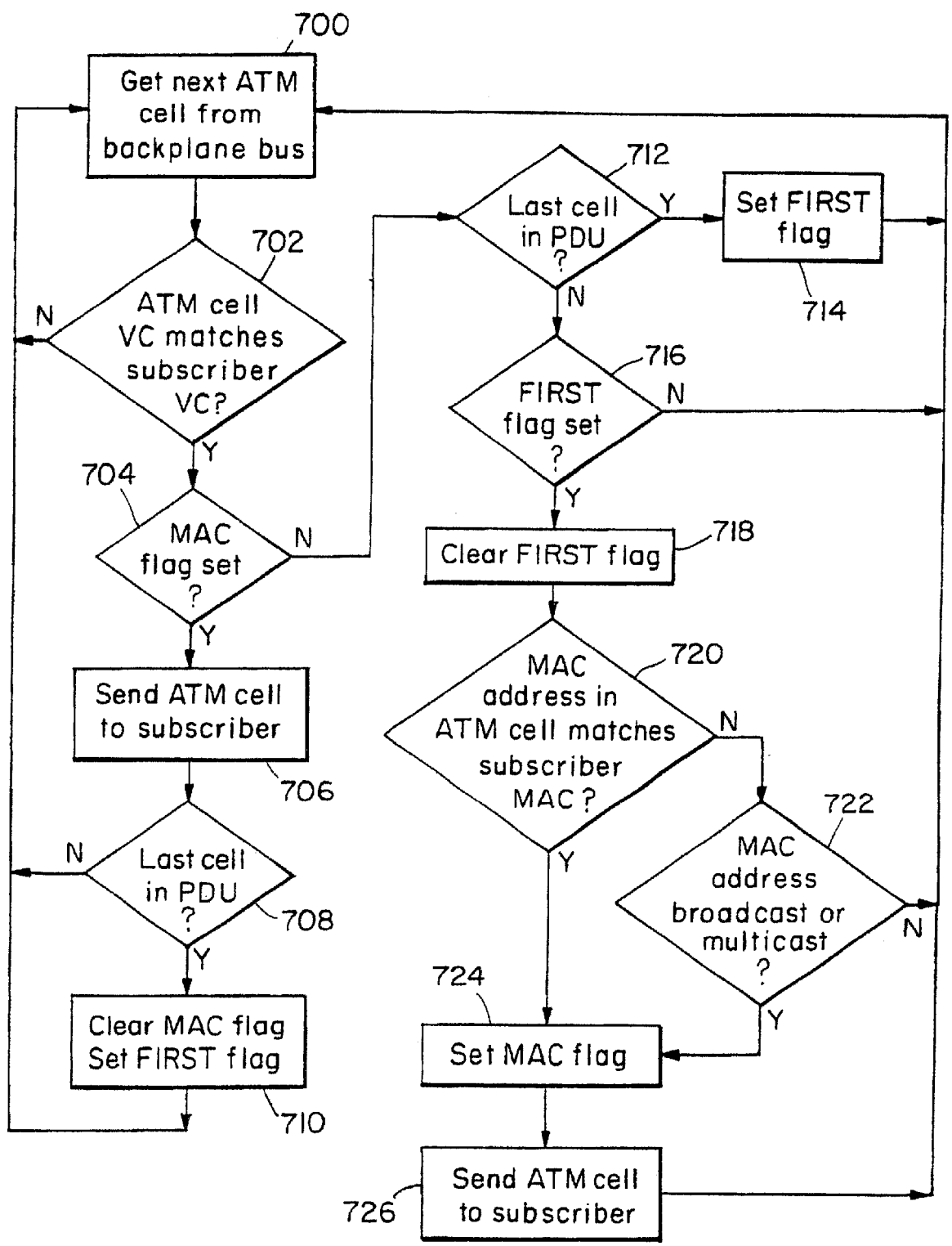
FIG. 7 is a flow diagram illustrating downstream processing of ATM cells in accordance with the present invention.

Referring now to FIG. 7, the diagram shows the logic flow for processing of downstream data for each subscriber port on the line unit 104 and shows how the virtual circuit identification and MAC address of Ethernet PDUs are processed in order to support the mechanism of allowing multiple users to share the same downstream virtual circuit. It should be noted that the per port downstream logic depends on the fact that the router 304 at the SP node 300A, 300B does not interleave cells from different PDUs in the same downstream virtual circuit. This result happens naturally in a router as PDUs are received, buffered and processed one at a time.

At step 700, the line unit 104 gets the next ATM cell from the backplane bus 102. At step 702, the line unit checks whether the virtual circuit information in the VCI field matches the VC assigned to the particular subscriber. If no match is found, then the next ATM cell is retrieved at step 700. If a match is found at step 702, then at step 704 the line unit checks whether the MAC flag is set. If the MAC flag has been set, then at step 706 the line unit sends the ATM cell to the subscriber and checks whether this cell is the last cell in the Ethernet PDU at step 708. If it is the last cell in the PDU, then at step 710 the MAC flag is cleared and the FIRST flag is set. Otherwise, processing resumes with the next ATM cell at step 700.

If the MAC flag has not been set at step 704, then the line unit checks whether the cell is the last cell in the PDU at step 712. If it is the last cell in the PDU, then the FIRST flag is set at step 714 and processing continues at step 700. Otherwise, at step 716 the line unit checks whether the FIRST flag has been set. If the FIRST flag has not been set, then processing again continues at step 700.

If the FIRST flag has been set at step 716, then it is cleared at step 718 and the line unit checks whether the MAC address in the ATM cell matches the MAC address of the particular subscriber at step 720. If there is a match, the MAC flag is set at step 724. Otherwise, a check is made whether the MAC address is a broadcast or multicast address, in which case the MAC flag is also set at step 724. Otherwise, processing continues at step 700.

If there is a match or the MAC address is roadcast/multicast, then at step 726 the ATM cell is sent to the subscriber and processing continues at step 700.

Referring again to FIG. 1, the router 304 at SP node 300B provides a bridging function between ATM and Ethernet. As described above, a virtual circuit on communication path 408 transports Ethernet PDUs for multiple users. Thus, multiple MAC addresses associated with the user nodes 200 will be using the same virtual circuit instead of a simple one-to-one mapping between MAC address and virtual circuit as in prior systems.

For upstream data, the router 304 performs an AAL5 reassembly function to reconstruct a bridged PDU from ATM cells that it receives from access node 100 through ATM network 400. The Ethernet packet is extracted from the PDU to construct IP packets for routing toward the Internet backbone 500.

For downstream data, the router 304 converts IP packets received from the Internet to Ethernet frames. Based on the MAC address of the Ethernet frame, the router 304 determines which virtual circuit to use for sending this Ethernet packet. Then the Ethernet packet is constructed as an AAL5 RFC-1483 bridged PDU and segmented into ATM cells for transmission to the end user via the previously determined virtual circuit.

Since the access node 100 runs at level 2, the Ethernet packet level, the protocol running on top of Ethernet is transparent to the access node. For the case of IP, IP address assignment is provided by the DHCP server 302 which may be part of the router 302 or on the service provider's network. The DHCP server 302 dynamically allocates IP addresses to end users as they are connected from a pool of IP addresses that it owns. The DHCP server 302 can also be enhanced to perform authentication and validation before an IP address is assigned.

One point to note is that the DHCP server 302 preferably directs its response at the intended user instead of broadcasting it. Otherwise, the responses could flood every user on the access node that belongs to the same bridge group of the router 304. To keep broadcast traffic, especially address resolution protocol (ARP) requests, from flooding the access node 100 and its users, the router 304 may need special ARP cache support. Preferably, such a router cache is in synch with the DHCP server 302 for live IP addresses.

To improve security and make the line units 104 of the access node 100 perform MAC address resolution more efficiently, a MAC address scheme based on the local access node 100 is used in the preferred embodiment. This local access node-based MAC address scheme is feasible if router 304 is configured so that the locally assigned MAC addresses for subnets of access node 100 are not in conflict with other IEEE 802.3 device addresses in the same bridge group on the router.

The local access node-based MAC address scheme is based on a unique access node ID, shelf number, slot number, subscriber number and customer premises equipment (CPE) device number. Through this scheme, the line units 104 can deal with a much smaller number of bits in the MAC address instead of treating the entire 48 bits of the standard MAC address. At the SP nodes 300A, 300B the router 304 can also take advantage of this scheme to make MAC address to VC mapping much easier. The following describes the MAC address optimization scheme.

The table below shows the fields in the 48-bit MAC address that correspond to an example of the preferred addressing scheme based on the access node 100:

TABLE 2

| | | msb | | | |
|---|---|---|---|---|---|
| 8 bits | 22 bits | 2 bits | 4 bits | 4 bits | 8 bits |
| 02 (Hex) | Node ID | Shelf No. | Slot No. | User No. | CPE No. |

The fields consist of the following:
- 02(Hex)—A fixed 8 bit pattern with the appropriate bit set to indicate locally assigned MAC address.
- Node ID—a 22 bit field for unique access node ID.
- Shelf No.—a 2 bit field that can address up to 4 shelves.
- Slot No.—a 4 bit field that can address up to 16 slots.
- User No.—a 4 bit field that can address up to 16 subscribers or user nodes.
- CPE No.—an 8 bit field that can address up to 256 CPE devices.

Meta-signaling is a mechanism that enables a CPE device to communicate with the line unit 104 in the access node 100 to coordinate the usage of VCs and MAC addresses. The VC for meta-signaling defined by ATM Forum is VPI=0/VCI=1 with all messages being one ATM cell long. When the ENID 206 powers up, it starts a meta-signaling process with the line unit 104. The line unit responds by sending the local access node-based MAC address to the ENID 206 to use for sending and receiving Ethernet PDUs. If the user is pre-subscribed to an ISP, the virtual circuit to use for sending and receiving PDUs is also sent to the ENID in the meta-signaling response.

In the downstream direction, the line unit 104 filters PDUs based first on the VC for each subscriber and then the MAC address for each subscriber as described with respect to FIG. 7. The access node-based MAC address scheme allows the line unit to filter the MAC address on the 6 bit Shelf and Slot Number fields and then send buffered PDUs to end users based on the 4 bit User Number field. The remaining 38 bit fields are don't-care bits for the line unit. Thus, by filtering only a 10-bit field, the line unit 104 can support up to 256 (8 bit) MAC addresses per subscriber.

As noted above, the line unit also picks up PDUs which contain Ethernet broadcast and multicast addresses and sends these PDUs to all its connected user nodes 200. Thus, IP multicast can be supported very efficiently without needing cell replication in the access node 100.

When the ENID 206 obtains the local MAC addresses to be used for sending and receiving Ethernet PDUs, it then allocates the pool of local MAC addresses to the PCs 202 connected to its Ethernet port and keeps a mapping table that translates the local access node-based MAC addresses to the Ethernet MAC addresses of the PCs. When the ENID 206 receives an Ethernet frame to be transmitted upstream, it replaces the MAC address in the Ethernet frame with the corresponding local access node-based MAC address before sending it upstream. In the downstream direction, the ENID 206 restores the original Ethernet MAC address before sending the Ethernet frame to the appropriate PC through its Ethernet port.

For most Ethernet PDUS, the MAC address only appears in the header of the PDU. However, there are Ethernet messages that contain MAC addresses in the data field, such as DHCP/BOOTP (bootstrap protocol) and ARP request and response messages. The ENID 206 translates these MAC addresses in the data fields appropriately. However, the ENID 206 does not perform MAC address translation for broadcast nor multicast MAC addresses.

In the alternate embodiment of FIG. 2, wherein the ANID 206' is a pure ATM transport device that converts ATM cells between XDSL format and ATM25 format, the MAC address translation function is performed by the ATM25 NIC driver in the user PC. The driver undergoes meta-signaling with the line unit 104 to obtain the local access node-based MAC address. It then uses the MAC address for the RFC-1483 Ethernet PDUs that it transmits and receives.

The router 304 can take advantage of the local access node-based MAC address scheme to optimize its MAC address to VC mapping. For the case where a router port is dedicated to VC-merged Ethernet traffic and only one VC is used between this port and any connected access node, the 22 bit access node ID field in the MAC address can be used to identify the required VC which is destined for the access node (e.g., the VC is configured so that the 22 bit access node ID becomes the 24 bit VPI/VCI of the VC).

According to another aspect of the present invention, the access node 100 provides multi-destination support that allows subscribers to select among destination SP nodes 300. Thus, the user's PC 202 can be connected to a different SP node as required without having to be rebooted. The method of selecting a destination is similar to the current scenario of using a dial up modem to connect to an ISP.

In one embodiment, multi-destination support is implemented as a local function between the ENID 206 and a Windows 95 application running on the subscriber PC 202 called node select (NS). The NS application is installed on the subscriber PC 202 with pre-configured VCs for particular SP destinations (e.g., VPI=0/VCI=40 for AmericaOnLine (AOL), VPI=0/VCI=50 for CompuServe). The subscriber runs the NS application to select a destination. When a destination is chosen (e.g., AOL), the NS application commands the PC 202 to release the current IP address (if one exist) and sends a message to the ENID 206 requesting the VC for the newly desired destination (e.g., VPI=0/VCI=40). The NS application waits for confirmation from the ENID 206, and then commands the PC 202 to acquire a new IP address. Thus, the PC 202 can switch from being connected to one SP node to another without having to be rebooted.

Figure 8:
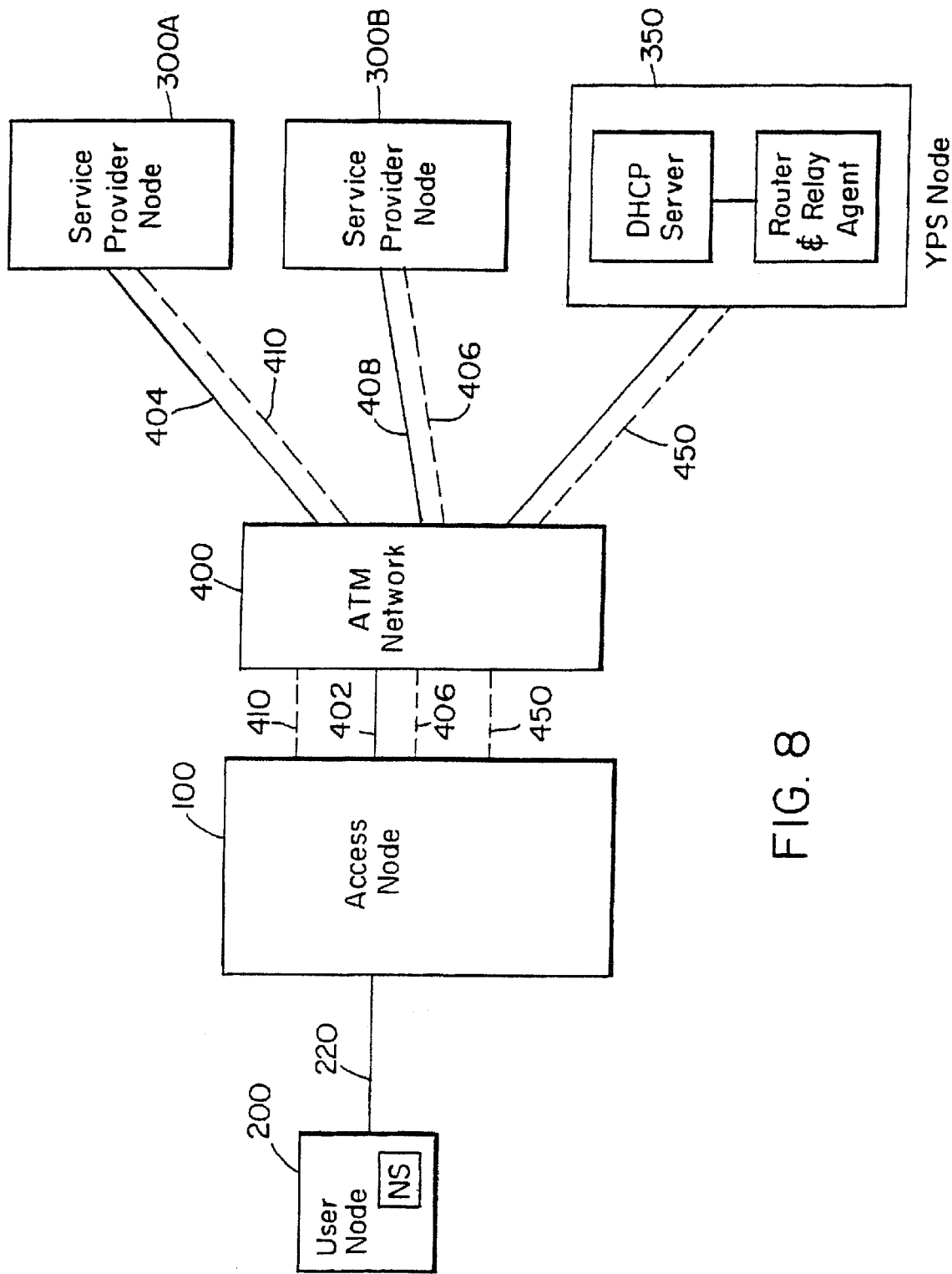
FIG. 8 is a block diagram illustrating multi-destination support in accordance with the invention.

In another embodiment shown in FIG. 8, multi-destination support is provided as a centralized yellow page service (YPS) from a network service provider (NSP) at a YPS node 350. The YPS node 350 provides authentication and an individualized menu of destinations for each subscriber. In addition, different grades of service to the same destination can be supported by allowing more than one service option to the same destination.

The YPS can be treated just like another destination for access node subscribers. Thus, the mechanism of getting to the YPS node 350 for each subscriber is the same as getting to a SP node. The only difference is that the VC for getting to the YSP is provided as a well-known VC which can be hard-coded into the NS application on the subscriber PC 202. The NS application is modified to connect the subscriber PC 202 to the YPS on the well-known VC on subscriber start up and between subscriber sessions to various destinations. While a subscriber PC 202 is connected to the YPS, the NS application behaves as a client program which communicates with a server program of the YPS to receive authentication, obtain and display destination information for subscriber selection.

Figure 9:
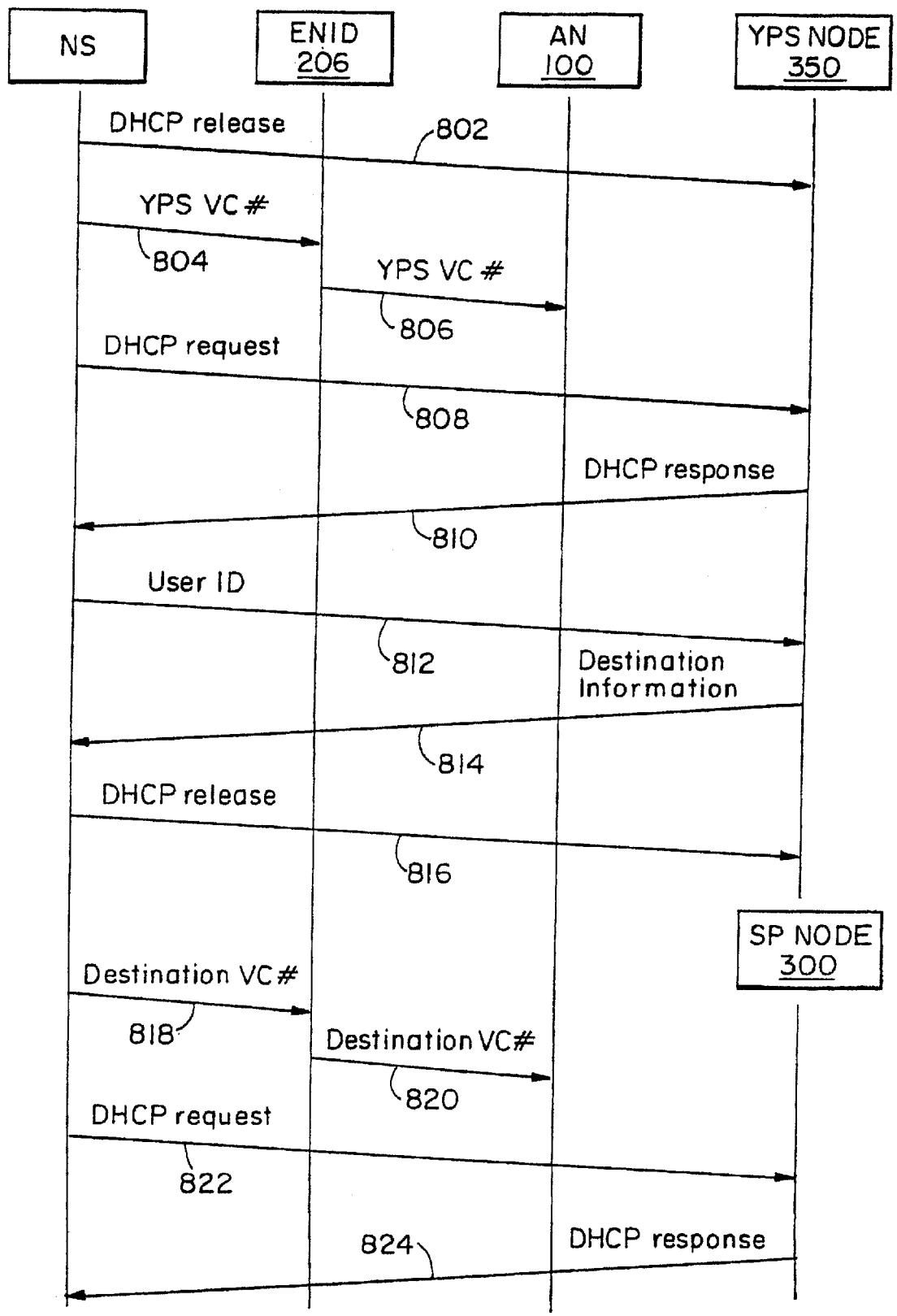
FIG. 9 is a diagram illustrating the message flow for the multi-destination aspect of the invention.

Referring to FIG. 9, the following provides a description of the data flows and state transitions during a destination selection process via the YPS node 350. The NS application on the subscriber PC 202 initiates the process.

Initially, the subscriber runs the NS application to connect the PC 202 to a desired destination node. The NS application commands the PC 202 to release its IP address (in case the PC is already connected to an IP network). The PC 202 sends a DHCP release message 802 to release its current IP address. The NS application then sends a message 804 to the ENID 206 indicating the well-known VC for connection to the YPS. The ENID 206 sets itself to receive PDUs on the specified VC and sends a message 806 to the line unit specifying the VC which is destined for the YPS. The line unit sets itself up to filter on the YPS VC and sends a confirmation message back to the ENID 206. The ENID 206 in turn sends a confirmation message to the NS application running on the PC 202.

The NS application commands the PC 202 to acquire an IP address. A DHCP request 808 is then sent from the PC 202 through ENID 206 and access node 100 to the YPS node. A DHCP server on the YPS node assigns an IP address and sends a DHCP response 810 back through the access node 100 and ENID 206 to the PC 202. Upon obtaining an IP address from the YPS node, the NS application communicates with a server at the YPS node by sending a message 812 to the server containing a user ID to start user authentication.

The YPS server authenticates the user, looks into the database to retrieve destination information for the user, including which VC is for which destination, and sends the information 814 to the NS application on the subscriber PC 202. The NS application displays all possible destination selections and prompts the user for input.

When a destination is chosen by the user, the NS application commands the PC 202 to release its IP address. The PC 202 sends a DHCP release message 816 to release its current IP address. The NS application then sends a message 818 to ENID 206 indicating the VC which corresponds to the destination chosen by the user. The ENID 206 sets itself to receive PDUs on the specified VC and sends a message 820 to the line unit 104 specifying the same VC. The line unit 104 sets itself up to filter on the VC and sends a confirmation message back to the ENID 206. The ENID 206 in turn sends a confirmation message to the NS application on the PC 202.

The NS application commands the PC 202 to acquire an IP address and then terminates its execution. A DHCP request 822 is sent from the PC 202 through the ENID 206 and the access node 100 to the destination node. A DHCP server on the destination node assigns an IP address and sends a DHCP response 824 back through the access node 100 and ENID 206 to the PC 202. Upon obtaining an IP address, the subscriber PC 202 is connected to the destination node. To switch to another destination, the subscriber again runs the NS application and the above process is repeated.

The access node line units 104 and the ENID 206 are designed so that multiple PCs can be supported on an ENID 206 by connecting the ENID 206 and PCs 202 with an Ethernet hub. In addition, the user of each PC can select an individual destination SP node, independent of the SP node connection of the other PCs.

Another way to support multiple PCs per user node 200 is to replace the ENID 206 with a local router having an ATM-25 and ANID or XDSL interface. The local router can also be configured to support multiple destinations by using separate VCs on its ATM WAN interface. The main differences between the local router and ENID embodiments include the following:

- A local router enables simultaneous connection to multiple destinations. The destination can be changed by changing the router setup only. Any destinations reachable by the router are reachable by all PCs connected to the router.
- The ENID 206 allows each PC to be connected to its own single destination, independent of any other PCs connected by the ENID. Thus the user of each PC can select an individual destination at any time.
- The local router enables many users on the LAN and prevents local LAN traffic from being transmitted upstream towards the ISP.
- The ENID 206 in its raw MAC address translation mode transmits local traffic upstream. Apart from occupying upstream bandwidth, local MAC frames will just be ignored by the SP router 304 and not cause any confusion. Preferably, the ENID 206 includes learning bridge functionality to identify local MAC frames and prevent their transmission upstream. A simpler approach is for the ENID 206 to filter MAC frames and send upstream only those having a payload type that is IP traffic. Thus, if the local PC 202 is configured to run local peer-to-peer networking on top of NetBEUI and make sure TCP/IP is only used to reach destination SP nodes 300, local data traffic will not be sent through access node 100.

For the case of a single PC 202 connected to the ENID 206, communication can be easily provided via an RS-232 serial port from the PC 202 to an RS-232 serial port on the ENID 206. However, this arrangement requires another connection between PC 202 and ENID 206 apart from the 10x base-T UTP connection and does not work for the case of multiple PCs connected to the ENID 206 via an Ethernet hub. Another way for the PC 202 to communicate with the ENID 206 is via Ethernet. However, the communication cannot utilize the TCP/IP protocol stack since it may not be running in the PC 202. The assumption is that the PC 202 is configured with both NetBEUI and TCP/IP as the transport layer protocol. Thus, the NS application can communicate with the ENID 206 via NetBIOS API running on top of NetBEUI.

With the VC multiplexing of the present invention, multiple PVCs can be provisioned in the ATM backbone network 400 from the access node 100 to a destination with different QoS levels. These VCs having differing QoS levels are provisioned in the access node 100 to be on the appropriate priority queue on the backplane bus 102. Thus, a user can be connected to the VC with the appropriate QoS level based upon subscription status.

To support multiplexing on a VC in a switched virtual circuit environment, the access node 100 becomes responsible for Q.2931 SVC signaling. The access node 100 signals to setup a connection to a destination SP node when a CPE device wants to communicate with that SP node and a VC does not exist between the access node and the SP node. After the connection is setup, any subsequent user desiring to communicate with the same SP node uses the same VC. The access node 100 signals the ATM network to tear down the VC to the SP node if all CPE devices which are connected to that SP node are disconnected.

EQUIVALENTS

While this invention has been particularly shown and described with reference to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A method of communicating to first service provider nodes over an ATM network from plural users connected to an access node, the method comprising the steps of:

provisioning a first virtual circuit through the ATM network for connecting a first access node to the first service provider node;

receiving first protocol data units intended for the first service provider node from plural users at the access node, the first protocol data units comprising plural ATM cells; and multiplexing the first protocol data units onto the first virtual circuit at the first access node such that the ATM cells of the first protocol data units are noninterleaving with the ATM cells of any other of the first protocol data units on the first virtual circuit and provisioning a second virtual circuit through the ATM network for connecting the access node to a second service provider node and wherein the step of receiving includes receiving second protocol data units intended for the second service provider node, each comprising plural ATM cells and wherein the step of multiplexing includes multiplexing the second protocol data units onto the second virtual circuit such that the ATM cells of any one of the second protocol data units are nonintcrleaving with the ATM cells of any other of the second protocol data units on the second virtual circuit.

2. The method of claim 1 wherein the first protocol data units have a first service priority and the second protocol data units have a second service priority, the first priority being higher than the second priority, and wherein the step of multiplexing includes preempting ATM cells of the second protocol data units with ATM cells of the first protocol data units.

3. The method of claim 1 further comprising transmitting from one of the plurality of users of the service provider nodes a request for a virtual circuit identifier associated with the second virtual circuit connecting the access node to a second service provider node; transmitting the virtual circuit identifier from the service provider nodes to the one user; and connecting the one user to the second service provider nodes using the virtual circuit identifier.

4. Apparatus for communicating to a first service provider node over an ATM network from plural users connected to an access node comprising:

a receiver for receiving first protocol data units intended for the first service provider node from plural users at the access node, each first protocol data unit comprising plural ATM cells; and a multiplexer for multiplexing the first protocol data units onto a first virtual circuit connecting the access node to the first service provider node through the ATM network such that the ATM cells of any one Ethernet protocol data unit are noninterleaving with the ATM cells of any other Ethernet protocol data unit on the first virtual circuit and for receiving second protocol data units intended for a second service provider node, each second protocol data unit comprising plural ATM cells and means for multiplexing the second protocol data units onto a second virtual circuit connecting the access node to said second service provider node through the ATM network such that the ATM cells of any one of the second protocol data units are noninterleaving with the ATM cells of any other of the second protocol data units on the second virtual circuit.

5. The apparatus of claim 4 wherein the first protocol data units have a first service priority and the second protocol data units have a second service priority, the first priority being higher than the second priority, and wherein the means for multiplexing includes means for preempting ATM cells of the second protocol data units with ATM cells of the first protocol data units.

6. The apparatus of claim 4 wherein the first and second protocol data units comprise Ethernet protocol data units.

7. A system comprising:

plural end user sites each having a network interface device for sending and receiving protocol data units, each protocol data unit comprising plural ATM cells;

a first virtual circuit connecting an access node to a first destination node through an ATM network, the access node coupled to the plural end user sites and having means for receiving first protocol data units intended for the first destination node from the network interface devices and means for multiplexing the first protocol data units onto the first virtual circuit such that the ATM cells of any one protocol data unit are noninterleaving with the ATM cells of any other protocol data unit on the first virtual circuit and wherein the access node further comprises means for receiving second protocol data units from the end user sites and means for multiplexing the second protocol data units onto a second virtual circuit connecting the access node to a second destination node through the ATM network such that the ATM cells of any one of the second protocol data units are noninterleaving with the ATM cells of any other of the second protocol data units on the second virtual circuit.

8. The system of claim 7 wherein the first and second protocol data units comprise Ethernet protocol data units.

9. The system of claim 7 wherein the access node communicates a virtual circuit identifier to each network interface device to indicate a proper virtual circuit for communication with an associated destination node.

10. The system of claim 7 wherein each network interface device provides an ATM adaptation layer SAR function to encapsulate Ethernet frames as bridged protocol data units.

11. An access node for communicating to a service provider node over an ATM network from plural users, the access node comprising:

a communication bus for transporting ATM cells;

at least one line unit for transmitting downstream and receiving upstream protocol data units to and from plural users, each protocol data unit comprising said ATM cells, the line unit coupling the ATM cells to and from the communication bus; and a trunk unit coupled to the communication bus for transmitting upstream ATM cells and receiving downstream ATM cells to and from the ATM network;

wherein the line unit further includes means for multiplexing the upstream protocol data units onto a virtual circuit connecting the access node to the service provider node and wherein the upstream ATM cells of any one upstream protocol data unit are noninterleaving with the upstream ATM cells of any other upstream protocol data unit on the virtual circuit and wherein the line unit further includes means for selecting downstream ATM cells from the communication bus that are destined for any of the plural users associated therewith based on a virtual circuit identifier and a PDU address in the ATM cells.

12. The access node of claim 11 wherein the upstream protocol data units comprise Ethernet protocol data units.

13. The access node of claim 11 wherein the means for selecting includes means for detecting start of a protocol data unit, means for buffering the said downstream ATM cells, means for detecting the PDU address, and means for buffering all ATM cells of the protocol data unit for transmission to a user associated with the PDU address.

14. The access node of claim 13 wherein the protocol data units comprise Ethernet protocol data units and the PDU address comprises an Ethernet MAC address.

* * * * *